United States Patent [19]

Pavonet

[11] 3,970,741
[45] July 20, 1976

[54] METHOD FOR PURIFYING PHOSPHORIC ACID

[75] Inventor: Engelhard Wilhelm Pavonet, Flemalle-Haute, Belgium

[73] Assignee: "Societe de Prayon", Belgium

[22] Filed: Jan. 31, 1974

[21] Appl. No.: 438,220

[30] Foreign Application Priority Data
Feb. 2, 1973  Luxemburg............................ 66958

[52] U.S. Cl............................................. 423/321 S
[51] Int. Cl.² ....................................... C01B 25/16
[58] Field of Search ................. 423/320, 321, 321 S

[56] References Cited
UNITED STATES PATENTS

| | | |
|---|---|---|
| 3,318,661 | 5/1967 | Schallert et al................. 423/321 S |
| 3,367,738 | 2/1968 | Schallert et al................. 423/321 S |
| 3,573,005 | 3/1971 | Baniel et al...................... 423/321 S |
| 3,607,029 | 9/1971 | Goret et al. ..................... 423/321 S |

FOREIGN PATENTS OR APPLICATIONS

| | | |
|---|---|---|
| 1,199,042 | 7/1967 | United Kingdom ............ 423/321 S |

*Primary Examiner*—Oscar R. Vertig
*Assistant Examiner*—Eugene T. Wheelock
*Attorney, Agent, or Firm*—McGlew and Tuttle

[57] ABSTRACT

A method for purifying phosphoric acid obtained with sulfuric acid acting on natural phosphates, comprises extracting the phosphoric acid with a mixed solvent formed essentially by 95% to 50% by volume of an ether containing 5 to 7 carbon atoms, and by 5% to 50% by volume of at least one of the esters resulting from the reaction of the phosphoric acid with alcohols having 3 to 5 carbon atoms.

9 Claims, No Drawings

3,970,741

METHOD FOR PURIFYING PHOSPHORIC ACID

BACKGROUND OF THE INVENTION

1. Field of the Invention

This invention relates to a method for purifying phosphoric acid obtained with sulfuric acid acting on natural phosphates, which comprises extracting said phosphoric acid with an ether-containing solvent, thus forming an aqueous phase containing the major part of the impurities and an organic phase containing purified phosphoric acid, and separating both said phases.

The phosphoric acid prepared with sulfuric acid acting on natural phosphates is normally obtained at the outlet from that filter which separates the residual gypsum as an impure solution containing 30 to 35% $P_2O_5$. Said acid is then concentrated by vacuum-evaporating to a $P_2O_5$ content in the range from 52 to 55% and it is sold commercially in such a form.

A typical analysis for such an acid is, for example, the following:

| | |
|---|---|
| $P_2O_5$ | 52% |
| F | 0.6% |
| $SO_3$ | 1.5% |
| $Fe_2O_3$ | 0.5% |
| $Al_2O_3$ | 0.6% |
| CaO | 0.1% |

2. Prior Art

In known methods of the kind described in U.S. Pat. No. 3,318,661 and Belgian Pat. No. 661,743, of isopropyl ether is used as a solvent for extracting $P_2O_5$ from a concentrated phosphoric acid and to purify same.

The advantage of isopropyl ether as solvent lies in the solubilizing power thereof for the phosphoric acid which is substantially zero below a concentration level which is in the range of 45% $P_2O_5$ and which reaches 100% for an acid with more than 60% $P_2O_5$. Moreover, such a solvent has a negative temperature coefficient as regards the solubilizing power thereof for $P_2O_5$. That is, at low temperatures this solvent extracts substantially more $P_2O_5$ than at higher temperatures. The impurity-distributing ratio between the extracted organic phase and the residual acid phase in this solvent is very advantageous since very few impurities go over to the organic phase together with the $P_2O_5$, and this is substantially less than for an alcohol-type solvent having 5 or 6 carbon atoms.

With such a solvent it is thus possible to extract high amounts of $P_2O_5$ from an acid in the cold with a high enough concentration and to recover the $P_2O_5$ from the complex phase which is thus formed simply by raising the temperature thereof, and this can be done in combination with a slight water addition. The phosphoric acid is thus extracted again with a high concentration, by means of a single operation comprising contacting the organic phase and the extracted phase. Moreover, the ether solubility is very low in the extracted acid and in the residual acid, and the latent vaporization heat thereof is also very low. Therefore, it is very easy and economical to recover this solvent by conventional means. These extraction methods based on the use of such a solvent are as advantageous as they are simple and economical and these methods provide well purified and concentrated phosphoric acids at low cost.

However, said known methods have important drawbacks. Thus, to obtain a large $P_2O_5$ extraction, said methods require the use of very concentrated phosphoric acids.

For example, from an acid with 55% $P_2O_5$, at 10°C it will not be possible to extract more than 72% $P_2O_5$. It will thus be required to obtain a larger extraction of $P_2O_5$, to concentrate the acid above 55%. This is however a very costly requirement as generally the output capacity of concentrating installations is very severely lowered when it is desired to go above a concentration of 55% $P_2O_5$.

It is also to be noticed that the known methods of extraction with isopropyl ether are generally very unsuitable for obtaining a high-purity acid and they are mostly used for a preliminary purifying.

OBJECTS OF THE INVENTION

The object of the present invention lies essentially in obviating the above drawbacks by providing an extracting solvent having properties which are different from those of isopropyl ether, mostly as regards the re-extraction of phosphoric acid from the organic phase. Other objects will be apparent from what follows hereinafter.

For this purpose the method according to the invention comprises extracting the phosphoric acid with a mixed solvent formed essentially by 95% to 50% by volume of an ether containing 5 to 7 carbon atoms, and by 5% to 50% by volume of at least one of the esters resulting from the reaction of the phosphoric acid with alcohols having 3 to 5 carbon atoms.

In an advantageous embodiment use is made of a mixed solvent formed by 95% to 50% by volume of isopropyl ether and by 5 to 50% by volume of tributyl phosphate.

In a preferred embodiment, the method according to the invention comprises performing the extraction with said mixed solvent in counterflow.

Other details and features of the invention will stand out from the description given below by way of non limitative example.

According to the present invention the phosphoric acid purifying method comprises extracting the $P_2O_5$ from the phosphoric acid with a mixture of solvents which is:

a. an ether-type solvent, symmetrical or asymmetrical, having from 5 up to 7 carbon atoms, and particularly isopropyl ether, said solvent being used at the rate of 50 to 95% by volume of the total volume and preferably from 80 to 90% of said volume;

b. a total ester-type solvent obtained from the phosphoric acid and alcohols having 3 or 4 carbon atoms, particularly tributyl phosphate.

Advantageously, said extraction is made at a temperature comprised between 5° and 25°C.

It has been noticed according to the invention that the addition of the solvent type (b) to the solvent type a) changes the solubility characteristics of the $P_2O_5$ in the mixed solvent thus obtained. Y-axis and of 200 cc of solvent with $P_2O_5$ content shown along the Y-axis. The solid line curve with One may observe that by the lowest concentrations in $P_2O_5$ of the acid, the $P_2O_5$ solubility in the mixed solvent is all the higher as the volume ratio of solvent (b) is higher while by high concentrations, the solubility remains near the value for the solvent of type (a). Indeed, the solubility curve in terms of the phosphoric acid concentration no longer has the marked solubility threshold which is a feature of the solvents of type (a) used alone.

Moreover, tests allow one to observe that the mixed solvent can be balanced by a large volume with the phosphoric acid without a third phase being formed. It is indeed known that solvents of type (a) in the presence of phosphoric acids of a given concentration extract the $P_2O_5$ from said acid up to a well-determined concentration threshold by forming a complex phase ether-phosphoric acid which is characterized by a constant weight ratio of the ether to the phosphoric acid. Any solvent excess added beyond some saturation value varying with the temperature, thus floats above the complex phase and does not dissolve substantially any $P_2O_5$. By adding the solvent (b) even to the extent of but 5% by volume, particularly as regards the tributyl phosphate, this third phase feature disappears in the interval of the operating conditions used. As a result it is possible to use the mixed solvent in a larger amount as volume by volume of acid to be extracted, without forming a solvent excess present as a third phase which does not take part in the extraction.

This unexpected change in the characteristics of solvent (a) caused by the addition of solvent (b) even in amounts as low as 5% by volume, has important results when using said mixed solvent thus obtained for extracting phosphoric acid.

Consequently, the progressive solubility of $P_2O_5$ in the mixed solvent enables counterflow extraction of acid with said mixed solvent instead of a single contacting, for example inside a mixer, which is usable with the solvents of type (a) alone.

It is possible in this way for an acid having a given concentration and at a given temperature, to exhaust the residual acid well beyond the concentration threshold of solvent (a) and to thus substantially increase the extraction ratio of $P_2O_5$.

To be able to extract with a large solvent volume which is thus advantageously possible with the method according to the invention, allows one to reduce very substantially the extraction of the impurities without markedly lowering the amount of $P_2O_5$ extracted. It has indeed been noticed that the extraction rate of those impurities accompanying the $P_2O_5$ and which go over in the organic phase varies together with the $P_2O_5$ concentration in the solvent. When the solvent is heavily loaded, that is with a high $P_2O_5$ concentration, the amount of impurities taken along is large. To the contrary when the solvent is less loaded, the amount of impurities taken along in terms of the amount of $P_2O_5$ extracted is substantially lowered. Thus, the extracted acid is purer.

It is also very important to note that in a quite unexpected way, it has been discovered that for equal solvent volume in the case of the solvent pair isopropyl ether : tributyl phosphate, the mixed solvent is more selective than isopropyl ether alone; that is, said mixed solvent extracts less impurities for the same amount of $P_2O_5$ extracted.

If use is made of a type (a) solvent only, there is obtained together with the phosphoric acid, the formation of a complex phase which causes the above-described threshold to appear. By using the mixed solvent according to the invention, the so-called complex phase defined by a constant ratio of solvent to phosphoric acid is eliminated as well as the solubility threshold for the phoshoric acid in the ether.

The cancelling of said complex phase allows one to perform advantageously the washing of the extraction organic phase with water without thereby releasing an excess solvent. Indeed, by washing with water the specific complex phase of type (a) solvents saturated with (a) solvent, there is released not only residual phosphoric acid which is heavier than the complex phase, but also lighter type (a) solvent. It is clear that the simultaneous presence of all three phases in the washing of the complex phase makes the washing operation much more intricate especially when working in counterflow and particularly in an apparatus of a continuous type, such as a pulsed column or similar apparatus, as there is caused in the complex phase which is the continuous bottom phase, the formation of type (a) solvent droplets which rise and of residual phosphoric acid droplets which go down.

According to the present invention, the washing of the organic phase as described above is made at a temperature from 5° to 25°C.

It should finally be noted that due to the possibility of increasing the mixed solvent amount beyond the volumes generally usable with the type (a) solvent alone, also allows one to obtain an organic phase which is less loaded with $P_2O_5$, that is less dense, less viscous and consequently one which separates substantially faster by the extraction and the washing steps than in the case of known methods making use as solvent of solvent (a) alone. Such an advantage more than compensates for the increased solvent throughput together with an acid dilution therein relative to said known methods.

3 to 8 mixed solvent volumes are preferably used per volume of phosphoric acid to be extracted.

It is clear that the re-extracting of that phosphoric acid which has gone over to the organic phase can no more occur by a simple heating and the addition of a small amount of water as with known methods using solvent (a) alone.

According to the present invention, the $P_2O_5$ should be extracted again in counterflow continuously or with multiple contactings and decantings. Such techniques being known per se, they will not be further described here.

This way of separating the $P_2O_5$ from the organic phase allows one to obtain a production acid which is relatively concentrated and has a very satisfactory purity. The re-extraction temperature used is usually about 20° to 50°C and preferably from 25° to 45°C.

Finally, it is concluded from the above discussion that the use of the mixed solvent as defined above substantially increases the extraction selectivity relative to the usual impurities and thus allows one to obtain a phosphoric acid which is clearly purer and which has an extraction output which is at least equal to the output of known methods.

When such extracting occurs according to the known technique, the so-called counterflow method, which comprises feeding the raw phosphoric acid, (that is, as coming from the phosphate attack) along one direction through an extracting apparatus and the mixed solvent along the opposite direction, it is discovered that the extraction output of $P_2O_5$ is increased and that the impurities in the resultant phosphoric acid are strongly reduced relative to the above-mentioned known methods.

It is also possible according to the invention, to react the concentrated phosphoric acid before the extraction with reagents for lowering the sulfate or fluorine content and forming a precipitate in the acid. The reagents which are generally used are $Na_2CO_3$, $NaOH$, soda metasilicate, silicate, fossil silica, activated silica, silica gel, $Ca(OH)_2$, $CaCO_3$, $CaCO$, $Ba(OH)_2$.

A feature of the invention is the possibility of extracting the suspension thus formed without prior separation of the solid content.

Generally the method according to the invention thus also applies to the treatment of a phosphoric acid loaded with solids.

EXAMPLES

To further illustrate the method according to the invention, some examples of practical tests performed on particular phosphoric acids are given hereinafter.

EXAMPLE 1.

One volume of phosphoric acid from the reaction of sulfuric acid on Kola ex-phosphate is extracted at a temperature of 5°C with 8 volumes of a mixed solvent comprised of 5% tributyl phosphate and 95% isopropyl ether.

Analysis of said unpurified phosphoric acid gives the following composition:

| | |
|---|---|
| $P_2O_5$ | 58.7% |
| $SO_3$ | 2.2% |
| $Fe_2O_3$ | 0.67% |
| $Al_2O_3$ | 0.80% |

The organic phase contains after separation, 86% by weight of the total $P_2O_5$ and the purified acid extracted again without previous washing has the following analysis:

| | |
|---|---|
| $P_2O_5$ | 50% |
| $SO_3$ | 1.2% |
| $Fe_2O_3$ | 0.050% |

By using the same acid and 4 volumes of the same solvent, there is obtained 88% of $P_2O_5$ extracted with the organic phase which has the following analysis:

| | |
|---|---|
| $P_2O_5$ | 50% |
| $SO_3$ | 1.35% |
| $Fe_2O_3$ | 0.10% |

By using the same acid and the isopropyl ether alone at the same temperature and to the extent of 4 volumes per volume of acid (solvent saturation of the complex phase), the extracted acid contains 88% of $P_2O_5$ and has the following analysis:

| | |
|---|---|
| $P_2O_5$ | 50% |
| $SO_3$ | 1.35% |
| $Fe_2O_3$ | 0.12% |

EXAMPLE 2.

One volume of phosphoric acid with 55% of $P_2O_5$ from natural Kola phosphate is extracted with a mixed solvent formed by a mixture of 5% tributyl phosphate and 95% isopropyl ether by a temperature of 10°C. The extraction rate is 70.5% $P_2O_5$ and the acid contained in the isolated organic phase has the following analysis:

| | |
|---|---|
| $P_2O_5$ | 50% |
| $SO_3$ | 1.2% |
| $Fe_2O_3$ | 0.030% |

By way of comparison, an extraction performed in the same conditions with isopropyl ether alone gives the following results:

Extraction rate : 71% of the $P_2O_5$ contained and a phosphoric acid in the organic phase giving the following analysis result:

| | |
|---|---|
| $P_2O_5$ | 50% |
| $SO_3$ | 1.55% |
| $Fe_2O_3$ | 0.062% |

EXAMPLE 3.

One volume of phosphoric acid with 55% $P_2O_5$ from natural ex-Kola phosphates is extracted with 4 volumes of solvent containing 95% isopropyl ether and 5% tributyl phosphate. The extraction is performed at 10°C according to the counterflow techniques and with three contactings. The results obtained are as follows:

Extraction rate for the $P_2O_5$ : 81%.

The extraction performed in the same conditions but with pure isopropyl ether as solvent, gives with a single contacting an extraction rate of 71% $P_2O_5$.

EXAMPLE 7.

One volume phosphoric acid with 58% $P_2O_5$ is subjected to an extraction with 4 volumes of solvent comprised of 95% isopropyl ether and 5% tributyl phosphate by a temperature of 5°C. Thereafter the separated organic phase is washed in counterflow with two contactings with 0.075 volume water.

The extraction rate for the $P_2O_5$ obtained in the washed organic phase is 85% and the iron content in a re-extracted phosphoric acid with 50% $P_2O_5$ is lower than 0.1%.

EXAMPLE 5.

One volume phosphoric acid with 55% $P_2O_5$ from ex-Kola natural phosphates, previously treated with 0.6% activated $SiO_2$ and 0.5% $Na_2CO_3$ (% by weight) is extracted with 4 volumes of a mixed solvent formed by 90% isopropyl ether and 10% tributyl phosphate by a temperature of 10°C. Thereafter the organic phase is washed twice with 0.05 volume water. The organic phase thus washed gives a re-extracted acid containing 56% of the total $P_2O_5$ as a pure phosphoric acid the analysis of which is as follows:

| | |
|---|---|
| $P_2O_5$ | 50% |
| $SO_3$ | 0.3% |
| F | 0.05% |
| $Fe_2O_3$ | 0.005% |
| $Al_2O_3$ | 0.004% |

It must be understood that the invention is in no way limited to the above embodiments and that many changes may be brought therein without departing from the scope of the invention as defined in the appended claims.

For example, other compositions of mixed solvents, for instance comprised of ether and of two compounds of type (b) can also be suitable.

I claim:

1. In the method for purifying phosphoric acid obtained by the reaction of sulfuric acid with natural phosphates, said method comprising extracting said phosphoric acid with an ether containing solvent forming an aqueous phase containing the major part of the impurities and an organic phase containing purified phosphoric acid and separating both said phases, the improvement which comprises extracting the phosphoric acid with a mixed solvent comprising 95% to 50% by volume of isopropyl ether and 5% to 50% by volume of tributyl phosphates and thereby forming only two phases during said extracting.

2. The improved method as claimed in claim 1, comprising successively adding to the phosphoric acid to be purified, reagents for lowering the content of one of the members selected from the group consisting of sulfate and fluorine, so as to form a precipitate, extracting the phosphoric acid with said mixed solvent and separating said precipitate after the extraction.

3. Method as claimed in claim 1, in which the extraction is performed with said mixed solvent in counterflow.

4. Method as claimed in claim 1, in which the extraction is performed by a temperature between 5° and 25°C.

5. Method as claimed in claim 1, in which the organic phase is washed with water in counterflow.

6. Method as claimed in claim 1, in which said washing is performed at a temperature lying between 5° and 25°C.

7. Method as claimed in claim 1, in which a reextraction of the phosphoric acid from said organic phase is performed in a counterflow with water.

8. Method as claimed in claim 1, in which the reextraction is performed in counterflow with water by a temperature between 20° and 50°C.

9. Method as claimed in claim 1, in which 3 to 8 volumes of mixed solvent are used per volume of phosphoric acid to be extracted.

* * * * *